INVENTORS
HARRY CHARNETSKY, JR.
WILLIAM R. MACLAY
BY
SUGHRUE, ROTHWELL, MION & ZINN
ATTORNEYS

United States Patent Office 3,072,752
Patented Jan. 8, 1963

3,072,752

APPARATUS FOR MANIFESTING INTELLIGENCE ON RECORD MEDIA

Harry Charnetsky, Jr., and William R. Maclay, Endicott, N.Y., assignors to International Business Machines Corporation, New York, N.Y., a corporation of New York Filed Oct. 12, 1959, Ser. No. 845,687
6 Claims. (Cl. 179—100.2)

This invention relates to improvements in apparatus for manifesting intelligence on record media and more particularly relates to an improved mounting for a magnetic transducer of the floated shoe type.

In the electronic data processing field, magnetizable record media have been quite useful in receiving and storing data to be processed until such data is required. Magnetic transducers associated with magnetizable media such as magnetic tapes, discs, or drums are adapted to be mounted closely adjacent to magnetizable surfaces without actually touching this surface during the recording or reading operation. Rotatable magnetizable record media such as magnetic drums and discs will always have some inherent eccentricity and irregularities of surface with regard to their support. Suitable means must be provided for allowing transducers associated with the eccentric magnetizable record medium to be positioned closely adjacent thereto without touching the record medium, and the transducer should be mounted so that it may follow the eccentricity of the record medium by movement toward and away from the surface thereof. Furthermore, the transducer should not move along the surface of the record medium in the direction of movement thereof or transverse to the direction of movement thereof. Any translational movement relative to the direction of movement of the record medium will cause an error in timing which will cause the possibility of error in data processing. Translational movement in a direction transverse to the direction of movement of the record medium will cause the transducer to move away from the center of the recording track, which correspondingly will result in poor quality recording and readout.

It is known in the art of magnetic data storage to support a sensing element or transducer on a shoe structure, which will float on a laminar film or fluid adhering to the surface of the rapidly moving record medium, for example, see the Maclay et al. Patent 2,863,004. It is also known in this art to provide a sensing element or magnetic transducer with a mounting means to permit the head to pivot about three axes and thereby permit rapid correction of the head position in three planes, e.g. Baumeister Patent 2,862,781.

The use of a universal mounting to allow a transducer supporting shoe to follow the air film in all directions is extremely desirable and such a mounting is broadly disclosed in the Baumeister patent noted above. However, by providing three axes for a transducer support to pivot about, some backlash or freedom in the pivot joints is likely to occur in the mounting arrangement. This backlash or pivot freedom will cause erratic positioning of the transducer with associated undesirable results resulting from the introduction of errors into a data processing system. Freedom in the pivots or pivotable mountings of the head supporting means cannot be tolerated. Therefore, it is a principle object of this invention to provide a universal mounting means for a floated shoe transducer in which each degree of freedom of the mounting means is pre-loaded in a manner to prevent backlash or freedom of movement in each pivotal joint.

It is an additional object of this invention to provide a gimbal type mounting for a floated shoe transducer in which the pivots of the gimbal are inherently preloaded and the gimbal supporting housing pivots about a preloaded point, such that there will be no backlash or random motion of the supported shoe and sensing elements carried thereby to introduce errors in timing or data processing.

It is an additional object of this invention to provide a magnetic transducer head which is simply constructed of individual parts, which themselves are simple thereby allowing the transducer of this invention to be constructed in sub-miniature size.

Other objects of the invention will be pointed out in the following description and claims and illustrated in the accompanying drawings which disclose, by way of examples, the principles of the invention and the best mode which has been contemplated of applying these principles.

In general, this invention includes a transducer assembly for cooperating with a rotatable magnetizable medium. The transducer assembly is of the floated shoe type, i.e. a shoe having a substantial area which is curved to conform to the periphery of the rotatable magnetic medium and hence is supported by the laminar film of air, which adheres to the surfaces of the record medium during rapid movement thereof. The shoe supporting the transducer and spacing this transducer from the record medium is universally mounted on a gimbal structure so that it may have two degrees of angular freedom, i.e. the shoe may pivot about an axis substantially parallel to the axis of rotation or the record medium and may pivot about an axis perpendicular to the first-mentioned axis in the direction of movement of the record medium. Further, the entire gimbal structure is pivotally mounted allowing the transducer sensing element to move toward and away from the surface of the record medium while translational movement along the surface of the record medium either in the direction or movement thereof or transverse to the direction of movement thereof is prevented. The gimbal mounting for the supporting shoe and sensing element allows the curved surface supporting shoe to better conform to the periphery of the rotatable magnetic medium. A spring is provided for biasing the supporting shoe and sensing element toward the surface of the record medium. A spring also is provided for pre-loading the pivot points of two axes of the universal mounting structure to prevent any backlash therein or freedom of movement. Spring biased arms of a yoke of the gimbal eliminate backlash in the third axis of the gimbal structure..

Figure 1:
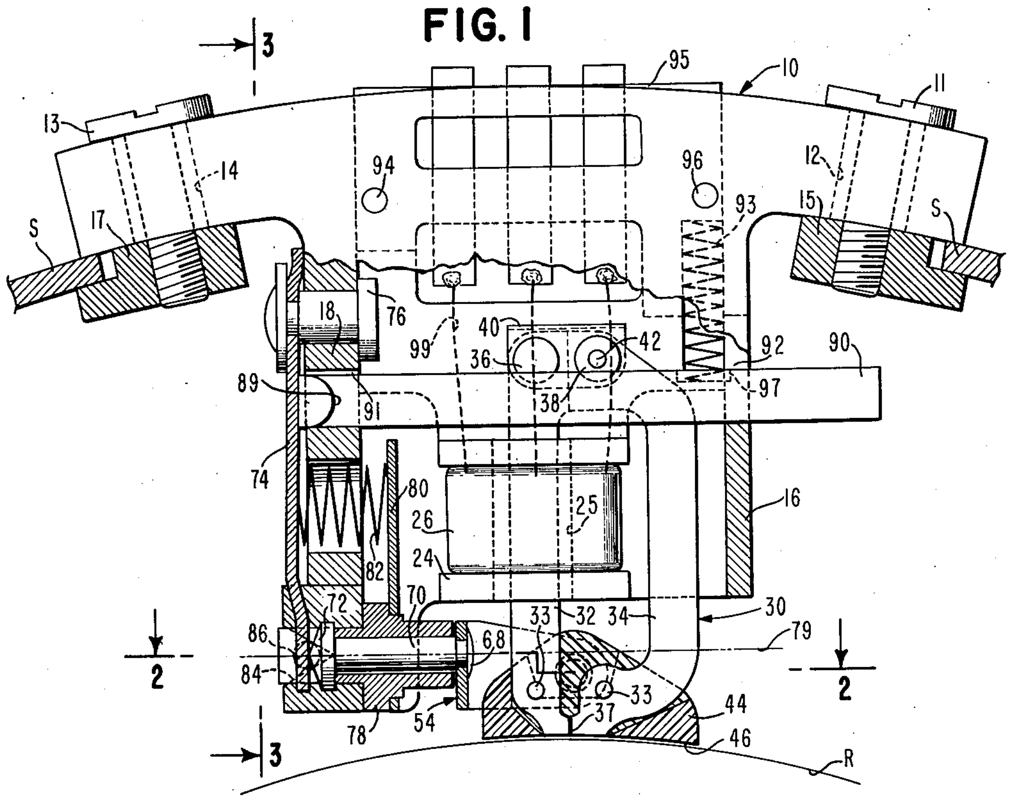
FIG. 1 is an elevation view, partially in section, illustrating the improved transducer mounting and supporting means of this invention.
Figure 2:
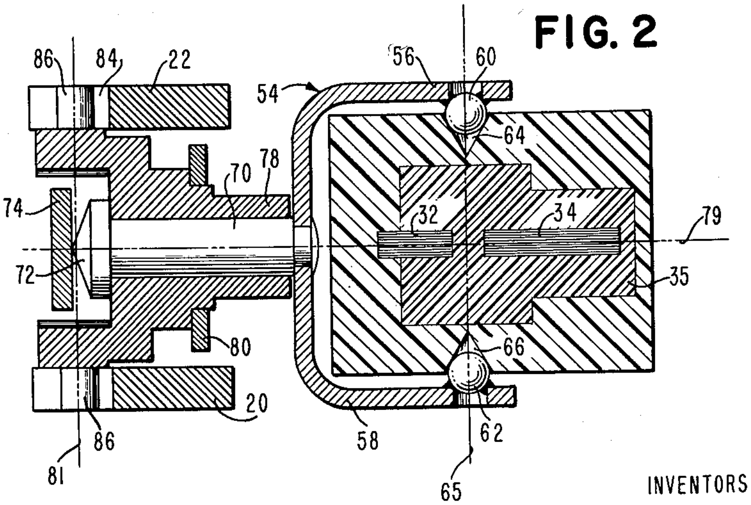
FIG. 2 is a sectional view taken along line 2—2 of FIG. 1.

Referring to the drawings, in FIGS. 1 and 2 there is shown a supporting housing 10 having suitable holes 14 and 12 therein for mounting the housing on a suitable support S adjacent a rotatable magnetic record medium R. The mounting is accomplished by screws 11 and 13 extending through holes 12 and 14 and threaded into lugs 15 and 17.

The support housing 10 includes side walls 16, 18, 20 and 22. A coil support 24 having a suitable electric coil 26 wound thereon is rigidly supported from the side walls of the housing.

Figures 3, 4:
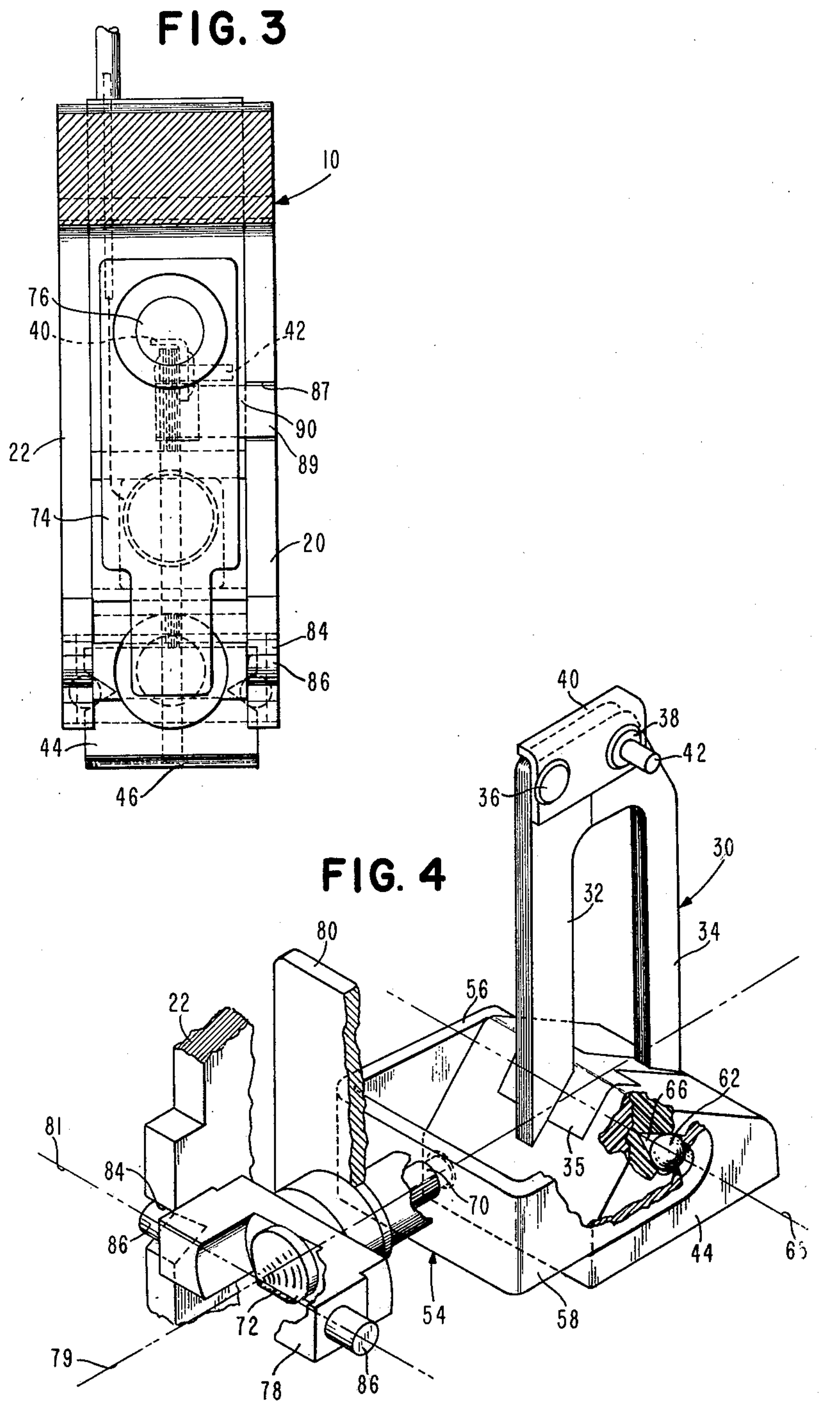
FIG. 3 is a sectional view taken along line 3—3 of FIG. 1.
FIG. 4 is a perspective view of the transducer supporting means with portions broken away and removed for the sake of clarity.

Mounted for free movement within a hole 25 in the coils support 24 is a core structure 30 of the two leg type, the core structure 30 including a leg 32 and a leg 34, which are connected together at the top by rivets 36 and 38 and a connecting bracket 40. Rivet 38 has an extension 42 as best shown in FIG. 4. The lower ends of the core legs 32 and 34 are secured to a supporting shoe 44 having a bottom surface 46 of relatively large area curved to conform to the peripheral surface of a rotatable magnetic record medium R. The core legs 32 and 34 are positioned in the sensing shoe by suitable pins 33 or the like and further secured by potting 35. A small separation is maintained between the core legs within the shoe 44 and adjacent the record medium R to provide an air gap 37 as is common practice in the magnetic recording art.

A gimbal structure allowing two degrees of angular freedom substantially in a plane parallel to the recording surface under the air gap is provided for mounting the shoe 44. This gimbal structure includes a yoke 54 having side legs 56 and 58. These legs are formed to bias attached ball members 60 and 62 into conical shaped depressions 64 and 66 within the side walls of support shoe 44. Thus, the support shoe is pivotably mounted for a degree of angular freedom about a pivotal axis through the center of both balls. The gimbal yoke 54 is secured by a rivet 68 to a pivot pin 70 having a pointed head 72 for cooperating with a flat biasing spring 74, which in turn is rigidly mounted to housing 10 by a securing rivet 76. A gimbal housing 78 surrounds the pivot pin 70 and has a spring stop 80 secured thereto. A coil spring 82 positioned between the flat spring 74 and spring stop 80 biases the entire gimbal assembly toward the recording surface R. It can be seen that pointed head 72 cooperating with flat spring 74 preloads the longitudinal axis of pin 70 and keeps the back side of head 72 always in contact with gimbal housing 78. The yoke 54 and shoe 44 pivotally carried thereby can therefore rotate or pivot about the axis 79 of pin 70.

A V notch 84 in each of the housing sides 20 and 22 is provided for cooperation with a pair of cylindrical rods 86 extending from the gimbal housing 78. These rods cooperate with the V notches 84 to prevent the sensing element supported by the supporting shoe 44 from moving along the recording track and they define pivotal axis 81. To conform to any irregularities or eccentricities of the record medium R in a plane transverse to the rotation thereof, support shoe 44 pivots about axis 79 through the cooperation of pin 70 pivotably mounted in the gimbal support structure or housing 78. Axes 79 and 65 allow shoe 44 to conform to any irregularities in the recording surface R regardless of any misalignmnet relative to the desired mounting on support housing S.

Means are provided for lifting the supporting shoe 44 and the core 30 carried thereby away from the recording surface R during starting so that the friction of the shoe bearing directly on the surface while the assembly is at rest will be eliminated, and the torque for starting the record medium will be consequently lessened. This head lifting means includes a lifting bar 90 secured or mounted in a hole 91 in housing side 18 and in a slot 92 in housing side 16. The head lifter arm 90 has a side projection 89 which is semicylindrical in shape as shown in FIGS. 1 and 3. The rounded side of projection 89 cooperates with a groove or notch 87 in housing side 20 to provide the pivotable connection of head lifter 90. Flat spring 74 biases the projection 89 of the head lifter 90 into the cooperating groove 87. As shown in FIGS. 1 and 3, when the arm 90 moves upward about the pivot point defined by projection 89 in groove 87, it contacts the rivet extension 42 rigidly secured to the core 30 and carries the core and connected shoe 44 upwards with it. Thus, to lift the shoe 44, a force need only be applied to the bottom of arm 90 to move the arm upwards. A spring 93 is provided for biasing the arm 90 to the bottom of slot 92. This spring cooperates with a bracket 95, mounted in the housing 10 on assembly pins 94 and 96 and with a depression 97 in the arm 90. Bracket 95 also supports suitable electrical connections 99 for the coil 26.

It is believed that the operation of the device is evident from the foregoing, however, a brief summary of the operation will be described. When a drum having recording surface R is at rest and it is desired to start the same, head lifter 90 is lifted upward against the bias of spring 93, thereby carrying the core 30 and supporting shoe 44 away from the recording surface R so that upon starting the record medium will not have to overcome the friction of shoe 44. Subsequently, when surface R is up to speed, the head lifter 90 is dropped to the bottom of the slot 92 under the force supplied by spring 93, and shoe 44 carrying core 30 will be supported on the laminar film of fluid adhering to the rapidly moving surface R completely independent of the head lifter 90. The supporting shoe 44 which positions the sensing portion of the transducer defined by sensing gap 37 is mounted by the gimbal structure allowing it two degrees of angular freedom about axes 65 and 79.

Translational movement along the recording surface R is prevented by rods 86 cooperating with V slots 84 and flat spring member 74 biased against pointed head 72. Movement in a direction transverse to the recording track is prevented by biasing arms 56 and 58 of the yoke 54 and restraint of the gimbal support structure 78 between sides 20 and 22 of the support housing. The spring 82 baises the gimbal supporting housing 78 and hence shoe 44 toward the surface of the drum, and this spring in combination with spring 74 assures that the gimbal support housing 78 will always abut against the flange behind pointed head 72. The parts and components are simply and easily assembled and the entire assembly may be manufactured in sub-miniature size.

The entire supporting and mounting structure is preloaded by the above-described arrangement in such a manner as to prevent backlash at each axis of rotation. That is, pivotable ball joints 60 and 62 cooperating with depressions 64 and 66 of shoe 44 and the inherent bias of the legs 56 and 58 of yoke 54 pre-load the pivotable connections along axis 65 and prevent backlash or freedom of movement along this axis. In addition, the action of flat spring 74 on pointed head 72 in combination with the action of conical spring 82 on spring stop 80 pre-loads the pivotable connections between projecting pins 86 and housing notches 84 and prevents backlash across the axis 81 defined by this combination. Also, the same combination of the flat spring 74, the pointed head 72, the gimbal housing 78, the spring stop 80 and coil spring 82 bias the gimbal housing 78 and the head 72 together to longitudinally load pivotal axis 79 to prevent the pivot point from moving in the direction of the track on the recording medium R, i.e. to prevent freedom of movement along pivotal axis 79. The pivotal connections of axis 81 allow the entire gimbal assembly to transcribe an arc and hence to move substantially perpendicular to the record surface R.

Another type of transducer assembly having a gimbal mounting similar to that described above is shown in FIGS. 5 and 6. This construction is somewhat different but the same inventive principles are involved, i.e. preloading the pivots of the supporting structure such that backlash in each axis of rotation is prevented.

Figure 5:
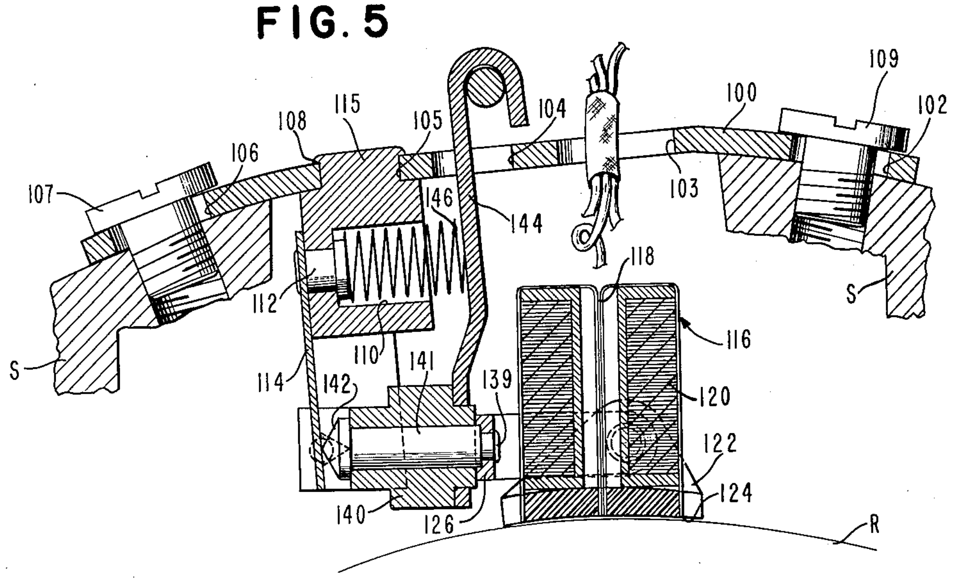
FIG. 5 is a sectional elevation view of a modified type of transducer and support and mounting means embodying the principles of this invention.
Figure 6:
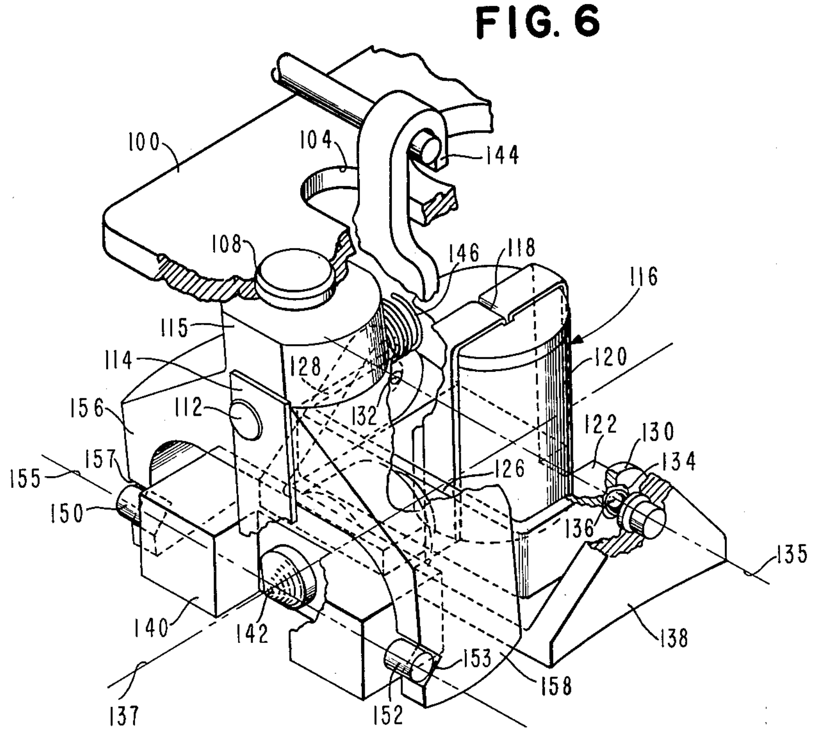
FIG. 6 is a perspective view of the transducer shown in the FIG. 5 modification with certain portions broken away and removed for the sake of clarity.

Referring to FIGS. 5 and 6, a mounting bracket 100 having holes therein 102, 103, 104, 105 and 106 is adapted to be mounted upon a support S adjacent the periphery of a rotatable record surface R by means of screws 107 and 109. In hole 105 in the support 100, a mounting member 115 is positioned. This mounting member 115 is secured to the bracket 100 by a peened top connection 108. The mounting member 115 has a blind bore 110 therein, and at the bottom of the blind bore, a rivet 112 secures a flat biasing spring 114. A transducer 116 having a core 118 and a coil 120 is directly supported upon a floated shoe 122, the shoe having a curved bottom surface 124 corresponding to the surface of the movable recording medium R. The shoe 122 and transducer 116 carried thereby are mounted on a gimbal structure, the gimbal structure including a yoke 126 having arms 128 and 130 with aligned conical shaped holes 132 and 134 for receiving pivot balls 136 carried by upstanding end sections 138 of the floating shoe 122. The yoke 126 is fixedly secured to a pin 141 by means of a rivet connection 139. The pin 141 is pivotally supported in a gimbal support housing member 140 and is mounted for angular movement within gimbal housing member 140 about its longitudinal axis. Thus, the floating shoe 122 may rotate about the axis of the pivots on the yoke, i.e. axis 135 as well as the transverse axis through the center of the pivot pin 141, i.e. axis 137. The pivot pin 141 has a pointed end 142 for cooperating with the flat biasing spring 114.

Secured to the housing member 140 is a head lifting member 144 which extends upwards through hole 104 in bracket 100. A spring 146 is positioned between the head lifter 144 and blind bore 110, and this spring biases the gimbal yoke 126 which carries the transducer 116 downwardly toward the record surface R.

Movement of the floated shoe 122 and its supported transducer 116 along the recording track is prevented by cylindrical pins 150 and 152 extending from gimbal housing 140 and positioned in V notches 157 and 153 in side arms 156 and 158 of mounting member 115. This defines the third axis of rotation 155. Flat spring 114 acting upon pointed head 142 maintains pins 150 and 152 in their respective notches. Movement transverse to the recording track is prevented by the inside surface of arms 156 and 158 cooperating with gimbal housing member 140.

This modification of the invention operates in a manner similar to the above-described embodiment and the inventive principles are the same. It is noted that the number of parts are somewhat less and this modification can likewise be applied to the sub-miniature size heads.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In combination, a rotatable storage drum having a surface which has at least some irregularities and some eccentricity with respect to the axes thereof, a magnetic transducer having a coil and a core, a supporting shoe for supporting said transducer, said shoe having a surface which is complementary to the surface of said drum, a transducer support housing stationarily positioned adjacent the surface of said drum, a gimbal having a yoke having normally biased arms pivotably attached to said shoe to provide pre-loaded pivot points, a gimbal support housing, a rotatable pin attached to said yoke, said gimbal support housing rotatably supporting said pin allowing said shoe rotational movement about an axis of rotation extending in the direction of movement of said drum, a flat spring attached to said transducer support housing and cooperating with said pin, pivotal connecting means connecting said gimbal support housing to said transducer support housing, means adapted to preload the pivotal axis defined by said pivotal connecting means on said gimbal housing cooperating with said transducer support housing together with said flat spring longitudinally loading said rotatable pin along its axis of rotation.

2. A device as defined in claim 1, wherein said normally biased yoke has arms which sandwich said shoe therebetween to preload said pivot points.

3. A device as defined in claim 1, wherein the arms of said yoke are normally biased outwardly to bear against upstanding portions extending from said shoe to normally bias the pivot points thereof.

4. An apparatus for manifesting intelligence on a record medium which is adapted to traverse a path closely adjacent thereto, said apparatus comprising: a support housing, a sensing transducer movably mounted relative to said housing, a shoe attached to said transducer for supporting said transducer adjacent said record medium on a fluid film which adheres to the surface of the record medium during rapid movement thereof, a gimbal structure having a two-armed yoke pivotably attached to said shoe, the arms of said gimbal yoke being normally biased to pre-load the points of pivotable connections to said shoe, said gimbal structure having an extending pin portion adapted to be enclosed within a gimbal housing, a flat spring attached to said support housing and extending adjacent said gimbal, said gimbal pin having a pointed end adapted to cooperate with said flat spring, said pointed head and said gimbal housing cooperating with said support housing such that under the bias of said flat spring said gimbal housing and gimbal supported thereby will not move in the direction of movement of said record medium, and a spring means cooperating between said support housing and said gimbal housing to bias said gimbal housing toward the surface of said movable record medium, said flat spring and biased yoke arms pre-loading said pivots so as to prevent backlash and freedom along any axis of rotation.

5. An apparatus for recording and sensing intelligence on a movable record medium having a substantially smooth surface with some slight irregularities thereon comprising; a sensing means; a floating shoe for supporting the sensing means in closely spaced relationship to the record medium and having a surface which is complementary to the substantially smooth surface of the record medium, the floating shoe being supported by a thin film of fluid which adheres to the surface of the record medium during rapid movement thereof; gimbal means for pivotally supporting the floating shoe about a first axis substantially perpendicular to the direction of movement of the record medium; spring biased arms integral with the gimbal means for pre-loading the pivotal supports between the gimbal means and the floating shoe to prevent free play therein, gimbal mounting means; a pivotal attachment between the gimbal means and the gimbal mounting means providing for rotational movement about an axis extending substantially in the direction of movement of the record medium; a fixed support, adjacent the surface of the record medium, the gimbal mounting means being pivotally mounted in the fixed support for rotational movement about a second axis substantially perpendicular to the direction of movement of the record medium whereby the shoe can move toward and away from the surface of the record medium; and spring biasing means between the fixed support and the pivotal attachment for pre-loading the pivotal connections between the gimbal means and the gimbal mounting means and between the gimbal mounting means and the fixed support to prevent free play therein.

6. An apparatus as defined in claim 5 wherein the spring biasing means comprises a flat spring having one end secured to the fixed support and the other end engaging the pivotal attachment between the gimbal means and the gimbal mounting means.

References Cited in the file of this patent

UNITED STATES PATENTS

| | | |
|---|---|---|
| 2,246,738 | Lanck | June 24, 1941 |
| 2,281,671 | Brown | May 5, 1942 |
| 2,639,203 | Sorse | May 19, 1953 |
| 2,862,781 | Baumeister | Dec. 2, 1958 |
| 2,863,004 | Maclay et al. | Dec. 2, 1958 |
| 2,912,519 | Simmons | Nov. 10, 1959 |
| 2,950,354 | Hohnecker | Aug. 23, 1960 |
| 2,965,721 | Hollabaugh | Dec. 20, 1960 |
| 2,972,738 | Sliter | Feb. 21, 1961 |
| 3,005,675 | Ledin | Oct. 24, 1961 |

FOREIGN PATENTS

| | | |
|---|---|---|
| 791,785 | Great Britain | Mar. 12, 1958 |
| 805,390 | Great Britain | Dec. 3, 1958 |

OTHER REFERENCES

Rolling Bearings, Allan; 1946 Pitman Publishing Corp., New York; pp. 235–236.